(12) United States Patent
Billings

(10) Patent No.: US 10,914,384 B2
(45) Date of Patent: Feb. 9, 2021

(54) METHOD FOR REFURBISHING AN ASSEMBLY OF A MACHINE

(71) Applicant: SOLAR TURBINES INCORPORATED, San Diego, CA (US)

(72) Inventor: David Sones Billings, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 180 days.

(21) Appl. No.: 15/969,831

(22) Filed: May 3, 2018

(65) Prior Publication Data
US 2019/0338855 A1 Nov. 7, 2019

(51) Int. Cl.
| F16J 15/3248 | (2016.01) |
| F01D 11/00 | (2006.01) |
| B23P 6/00 | (2006.01) |
| B24C 1/10 | (2006.01) |

(52) U.S. Cl.
CPC .......... *F16J 15/3248* (2013.01); *B23P 6/002* (2013.01); *B24C 1/10* (2013.01); *F01D 11/005* (2013.01); *F05D 2230/54* (2013.01); *F05D 2230/80* (2013.01); *F05D 2240/11* (2013.01); *F05D 2240/55* (2013.01)

(58) Field of Classification Search
CPC .............. B23K 26/0006; B23K 26/356; B23K 2101/001; B23P 6/002; B23P 6/007; B23P 2700/13; B24C 1/10; F01D 5/005; F01D 11/005; F01D 2230/12; F01D 2230/54; F01D 2230/80; F01D 2230/90; F01D 2240/11; F01D 2240/55; F16J 15/3248; B21D 31/06
See application file for complete search history.

(56) References Cited

U.S. PATENT DOCUMENTS

| 4,329,862 | A | * | 5/1982 | Harburn | B24C 3/14 72/53 |
| 4,350,035 | A | * | 9/1982 | Kopp | B21D 31/06 72/53 |
| 4,694,672 | A | * | 9/1987 | Baughman | B24C 1/04 451/38 |
| 4,974,434 | A | * | 12/1990 | Reccius | B21D 1/00 29/81.01 |
| 6,289,736 | B1 | | 9/2001 | Statnikov | |
| 6,296,172 | B1 | | 10/2001 | Miller | |
| 6,338,765 | B1 | | 1/2002 | Statnikov | |

(Continued)

FOREIGN PATENT DOCUMENTS

WO 2012152259 11/2012

*Primary Examiner* — Jacob J Cigna
(74) *Attorney, Agent, or Firm* — Procopio, Cory, Hargreaves & Savitch LLP

(57) ABSTRACT

A method for refurbishing an assembly having a first component and a second component is provided. The first component has a fore portion welded to the second component and a flared aft portion in proximity with the second component. The method includes processing the assembly such that the flared aft portion and a part of the fore portion proximal to the flared aft portion of the first component is subject to peening until the flared aft portion is plastically deformed from an initial position to a desired final position with respect to the second component.

10 Claims, 7 Drawing Sheets

(56) References Cited

U.S. PATENT DOCUMENTS

| | | | |
|---|---|---|---|
| 6,843,957 B2 | 1/2005 | Statnikov | |
| 6,932,876 B1 | 8/2005 | Statnikov | |
| 6,938,448 B2 * | 9/2005 | Kennerknecht | B21D 11/08 |
| | | | 29/90.7 |
| 7,181,944 B2 * | 2/2007 | Wuestefeld | B21D 11/085 |
| | | | 29/90.7 |
| 7,301,123 B2 | 11/2007 | Statnikov | |
| 7,334,984 B1 * | 2/2008 | Stine | F01D 11/127 |
| | | | 415/173.1 |
| 7,344,609 B2 | 3/2008 | Statnikov | |
| 7,431,779 B2 | 10/2008 | Statnikov | |
| 7,578,509 B2 * | 8/2009 | Grondahl | F16J 15/3292 |
| | | | 277/355 |
| 8,152,462 B1 * | 4/2012 | Williams | F16J 15/3292 |
| | | | 277/355 |
| 9,249,672 B2 | 2/2016 | Bunker et al. | |
| 2004/0150165 A1 * | 8/2004 | Grondahl | F16J 15/3292 |
| | | | 277/355 |
| 2009/0094829 A1 * | 4/2009 | Bunting | B23P 6/002 |
| | | | 29/888.021 |
| 2010/0257910 A1 * | 10/2010 | Castle | B21D 31/005 |
| | | | 72/57 |
| 2011/0308290 A1 | 12/2011 | Bunting et al. | |
| 2012/0084958 A1 * | 4/2012 | Duret | B23P 6/002 |
| | | | 29/402.19 |
| 2014/0290808 A1 | 10/2014 | Sharman et al. | |
| 2017/0291280 A1 * | 10/2017 | Friedman | B21D 31/06 |

* cited by examiner

METHOD FOR REFURBISHING AN ASSEMBLY OF A MACHINE

TECHNICAL FIELD

The present disclosure relates to a method for refurbishing a component of a machine assembly. More particularly, the present disclosure relates to a method for refurbishing a component within an assembly of two or more machine components without the need to disassemble the assembly.

BACKGROUND

In many cases, portions of adjacently located machine components in a machine assembly may be welded to one another, and other portions of the adjacent machine components, that extend from these welded portions, may be located in a spaced apart manner i.e., at a distance from one another. However, upon operation of the machine assembly, this distance may change owing, at least in part, to various types of loading that the machine components would be subject to. For example, with a difference in coefficients of thermal expansion between adjacent machine components, expansion characteristics of individual components may be different and hence, one machine component may expand more than the other, and in some cases, such expansion may also result in a plastic deformation of one or more components present in the assembly.

In some cases, the distance between portions of adjacent machine components may need to be a certain amount for facilitating the machine assembly to accomplish one or more functions it has been designed for. However, with use of traditional overhauling techniques, one or more components in the assembly would be disassembled and replaced entailing additional costs, time, and effort in doing so. Hence, there is a need for a method that is simple, cost-effective, and which can help refurbish the assembly quickly as compared to the use of traditional overhauling techniques.

SUMMARY OF THE DISCLOSURE

In an aspect of this disclosure, a method is provided for refurbishing an assembly having a first component and a second component. The first component has a fore portion that is welded to the second component and a flared aft portion that is located in proximity with the second component. The method includes processing the assembly such that the flared aft portion and a part of the fore portion proximal to the flared aft portion of the first component is subject to peening until the flared aft portion is plastically deformed from an initial position to a desired final position with respect to the second component.

In another aspect, a method is provided for refurbishing a first component having a fore portion welded to a second component and a flared aft portion extending angularly from the fore portion such that the flared aft portion is in proximity with the second component. The method includes subjecting the flared aft portion and a part of the fore portion proximal to the flared aft portion of the first component to peening until the flared aft portion is plastically deformed from an initial position to a desired final position with respect to the second component.

In yet another aspect, embodiments of the present disclosure are also directed to a refurbished assembly that comprises a sealing ring having a mounting rail that is located adjacent to a circumference of the sealing ring. The refurbished assembly also includes a shroud that is fabricated from sheet metal and disposed concentrically about the sealing ring. The shroud has a fore portion and a flared aft portion angularly extending from the fore portion. This flared aft portion of the shroud is peened until the flared aft portion is plastically deformed from an initial position to a desired final position with respect to the mounting rail of the sealing ring.

Other features and aspects of this disclosure will be apparent from the following description and the accompanying drawings.

DETAILED DESCRIPTION

Figure 1:
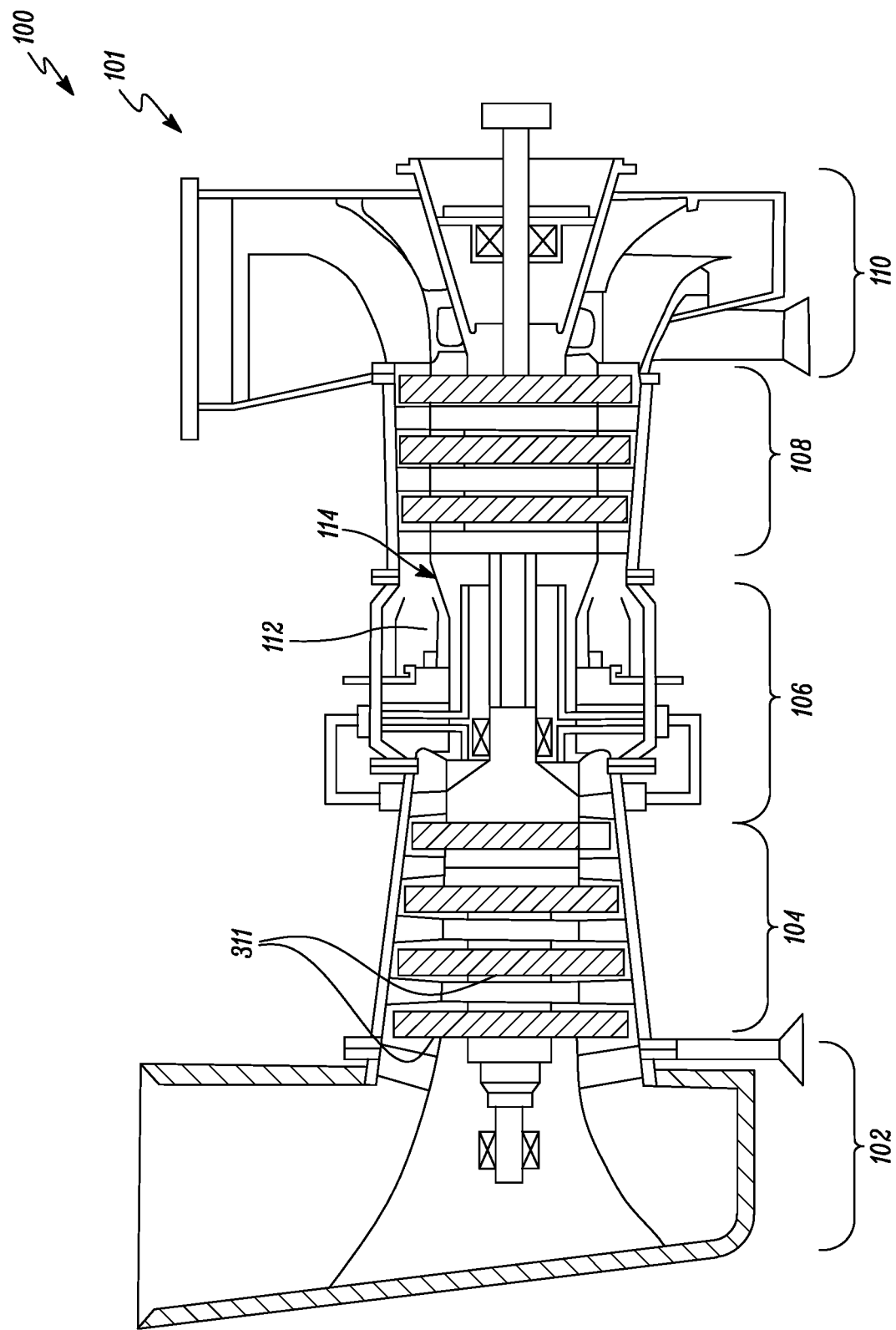
FIG. 1 is a side sectional view of an exemplary machine showing an exemplary assembly that could be employed in a turbine section of the exemplary machine, in accordance with an embodiment of the present disclosure.
Figure 2:
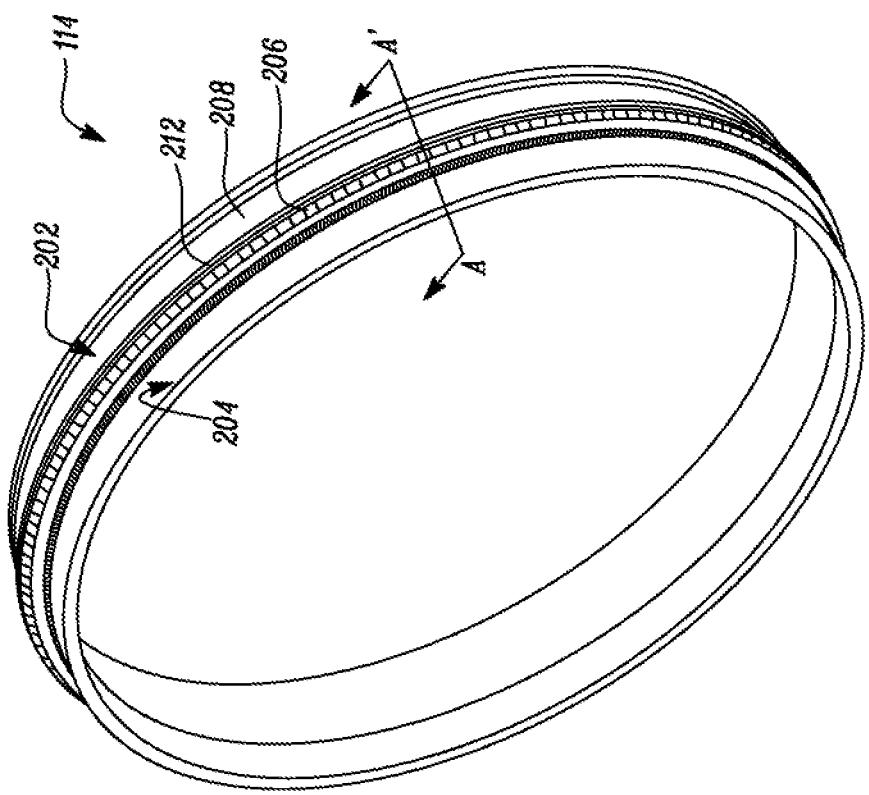
FIG. 2 is a front perspective view of the exemplary assembly from FIG. 3 showing a shroud as the first component and a sealing ring as the second component, in accordance with an embodiment of the present disclosure.

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The present disclosure relates to a method for refurbishing a component of a machine assembly. More particularly, the present disclosure relates to a method for refurbishing a component within an assembly of two or more machine components without the need to disassemble the assembly. Although, the present disclosure is explained in conjunction with components of an assembly that forms part of a gas turbine engine, in other embodiments, methods disclosed herein can be similarly applied for refurbishing assemblies, or individual components thereof, from other types of machines, including but not limited to, internal combustion engines, turbomachines such as stand-alone compressors, turbines, or other machines known to persons skilled in the art.

Numerals denoting assemblies, components, or portions, for example, an assembly 114, a first component 202, a second component 204, a fore portion 208 of the first component 202, and a flared aft portion 212 of the first component 202 will be referenced in FIGS. 1 through 7. Such references should be understood as being made to explain the method disclosed herein.

FIG. 1 depicts an exemplary machine 100 that is embodied in the form of a turbomachine, in accordance with an embodiment of the present disclosure. The turbomachine may be of any type. In the illustrated embodiment shown in FIG. 1, the turbomachine is a gas turbine engine 101. This gas turbine engine 101 may be used to drive a generator for power generation, or other mechanical assemblies such as a compressor. Alternatively, the gas turbine engine 101 may be employed in mobile machines such as, but not limited to, earth moving machines, passenger vehicles, marine vessels, or any other mobile machine known in the art.

As shown, the gas turbine engine 101 may include an inlet section 102, a compressor section 104, a combustor section 106, a turbine section 108, and an exhaust section 110. The compressor section 104 may include a series of compressor blades 311 that are rotatable to compress air. As the compressor blades 311 are rotated, the compressor blades 311 may draw air into the gas turbine engine 101 via the inlet section 102 for pressurizing the drawn air. The pressurized air may then be directed towards the combustor section 106. The combustor section 106 may mix a liquid and/or gaseous fuel with the compressed air from the compressor section 104 and combust the mixture of fuel and air to produce a mechanical work output that can be used to drive the turbine section 108. Products of combustion may then exit the turbine section 108 via the exhaust section 110 of the gas turbine engine 101.

Further, as shown in FIG. 1, the combustor section 106 may include multiple combustion chambers 112 that are annularly arranged within the combustor section 106. The gas turbine engine 101 may further include an assembly 114 that is located in the turbine section 108. As best shown in FIGS. 2-7, this assembly 114 includes, inter alia, a first component 202, and a second component 204 that are embodied in the form of a shroud and a scaling ring respectively. For sake of simplicity, the first component 202 will hereinafter be referred to as 'the shroud' and denoted by identical numeral '202'. Similarly, the second component 204 will hereinafter be referred to as 'the sealing ring' and denoted by identical numeral '204'.

Figure 3:
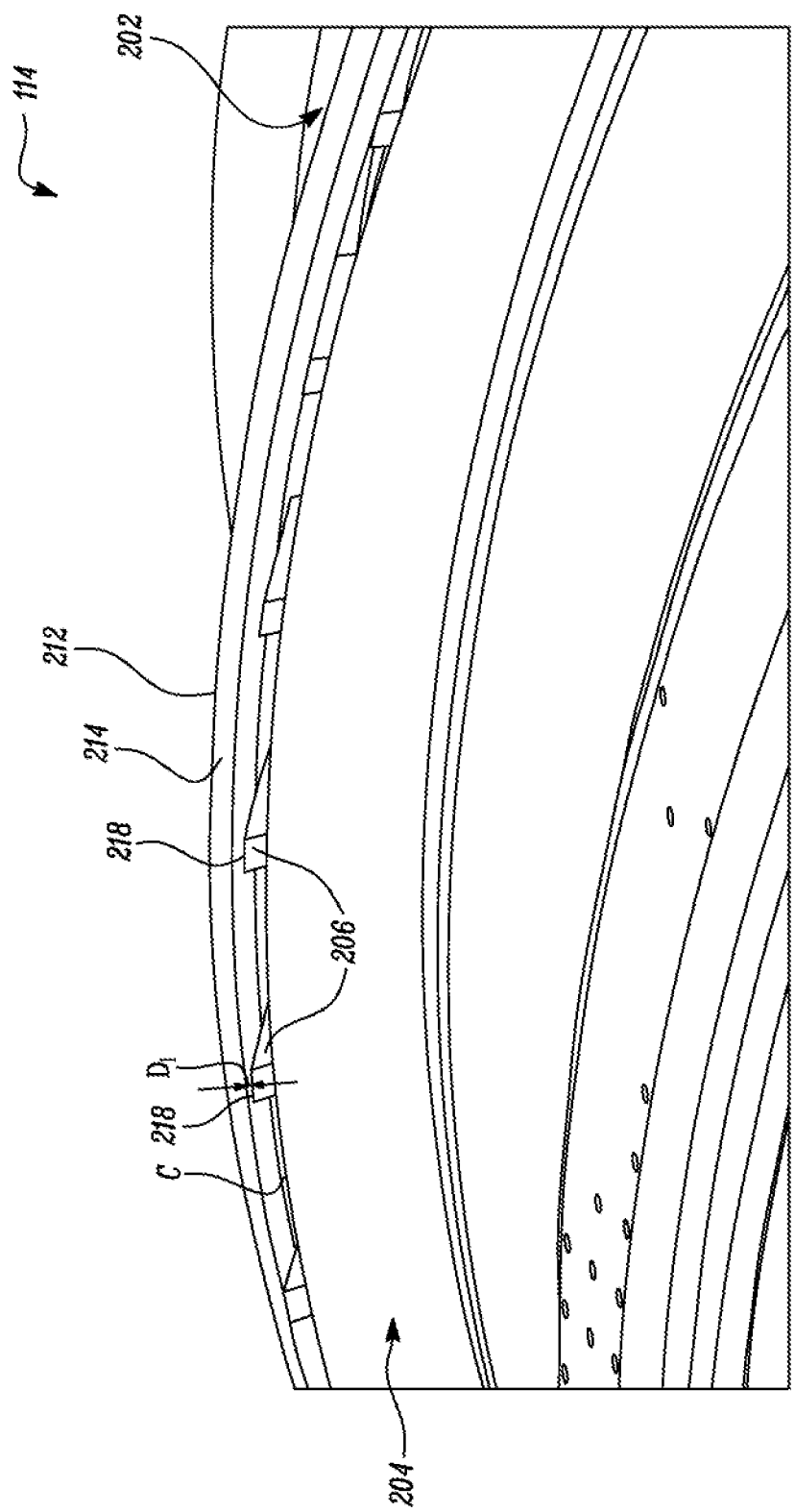
FIG. 3 is an enlarged rear perspective view of the exemplary assembly taken from FIG. 2, in accordance with an embodiment of the present disclosure.
Figure 4:
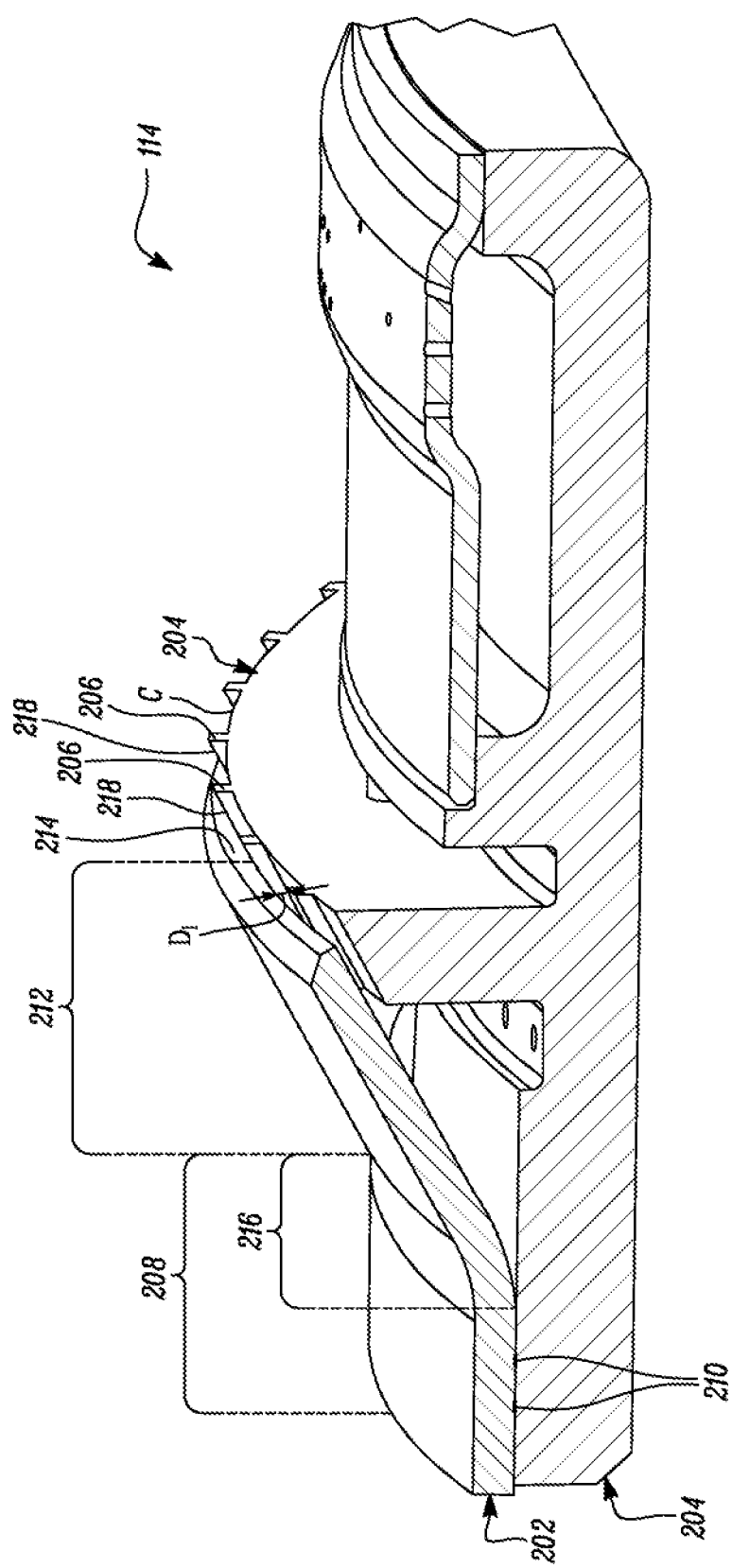
FIGS. 4 and 5 are perspective and orthogonal side-sectional views of the exemplary assembly taken along section line AA' of FIG. 2, in accordance with an embodiment of the present disclosure.

As best shown in FIGS. 3-4, the sealing ring 204 has multiple mounting rails 206 that extend radially from a circumference C of the sealing ring 204. Although multiple mounting rails 206 are shown to impart a toothed or tiered configuration to the sealing ring 204 in the illustrated embodiment of FIGS. 3-4, in other embodiments, the sealing ring 204 could have a single contiguous mounting rail in lieu of the multiple mounting rails 206 disclosed herein.

Figure 5:
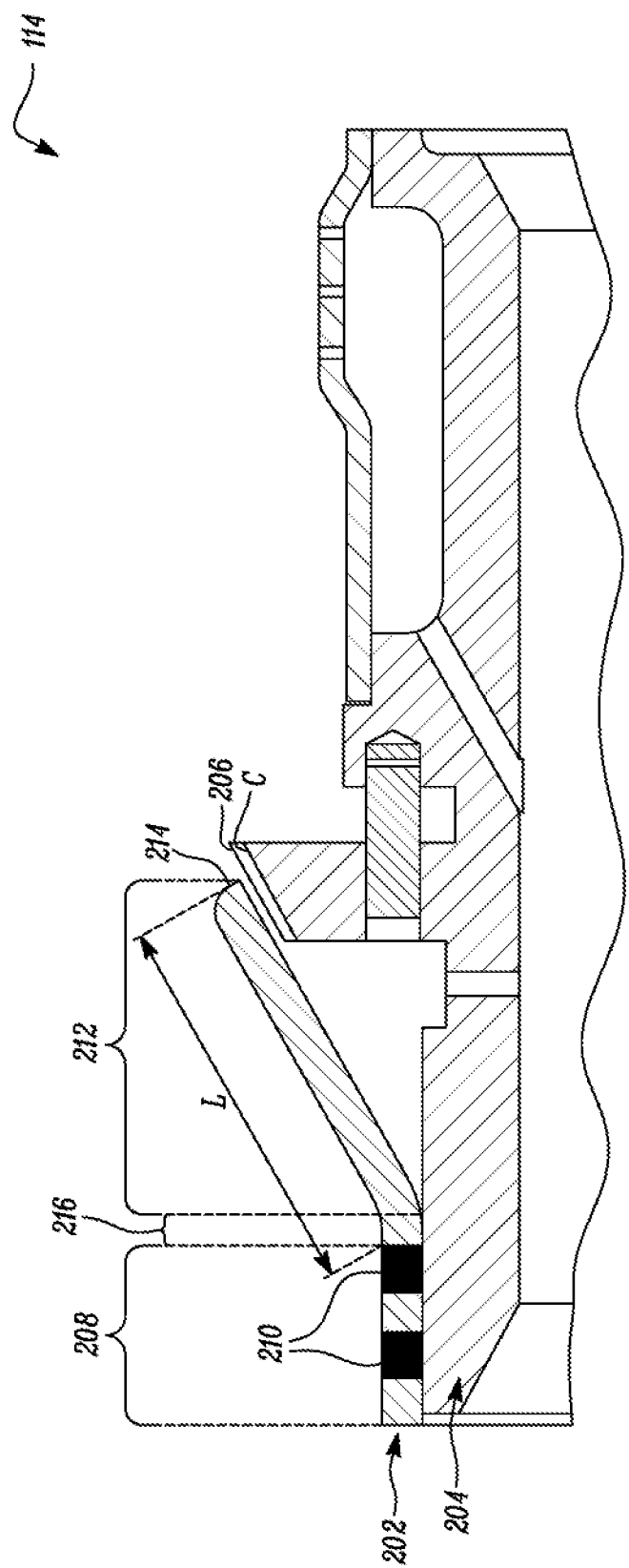

As best shown in FIGS. 4-5, the shroud 202 has a fore portion 208 that is welded to the sealing ring 204 via one or more welds 210. These welds 210 may include, for example, Tungsten Inert Gas (TIG) welds, Metal Inert Gas (MIG) welds, or other types of welds known to persons skilled in the art.

Further, the shroud 202 also has a flared aft portion 212 that extends angularly from the fore portion 208 and is disposed in proximity with the sealing ring 204. The flared aft portion 212 has an end 214 that is configured to co-operate with each mounting rail 206 of the sealing ring 204.

During combustion of fuel-air mixture by the combustor section 106, heat would be released, together with the byproducts of combustion, from the combustion chambers 112 of the combustor section 106. This heat from the combustion chambers 112, with or without other types of mechanical and thermal loads, may be incident on the flared aft portion 212 of the shroud 202, and may cause the end 214 of the flared aft portion 212 to be displaced from a desired position to a displaced position in relation to the mounting rail 206 of the sealing ring 204, as shown exemplarily in the view of FIG. 4.

In embodiments herein, the present disclosure relates to a method for refurbishing the shroud 202 of the assembly 114, and preferably, without dissembling the shroud 202 from the sealing ring 204. Although embodiments of the present disclosure may be applied vis-à-vis the method for refurbishing components after being disassembled from an overall assembly of a machine, it will be appreciated that the method disclosed herein can also help technicians save time, costs, and effort as an assembly of components, for example, the assembly 114 disclosed herein can be refurbished without the need for disassembly.

Figure 6:
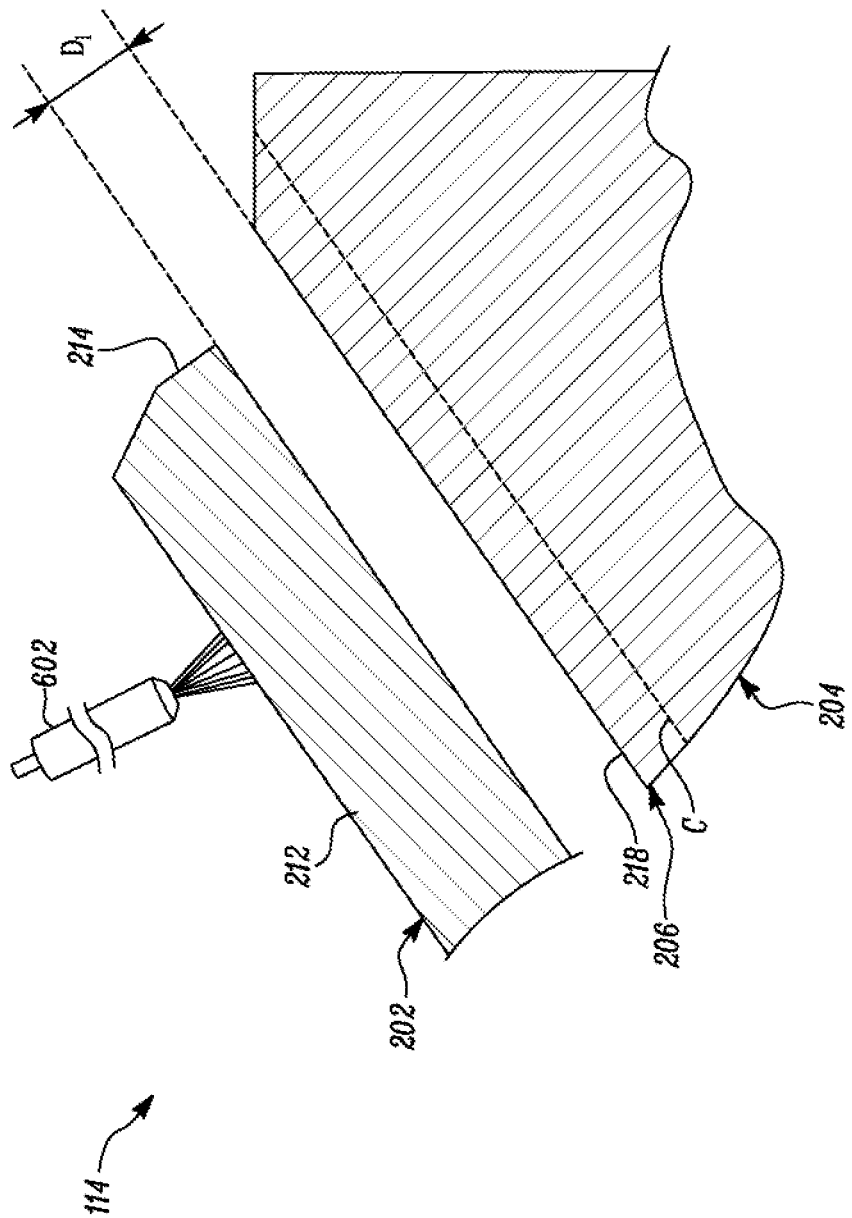
FIG. 6 is a diagrammatic view of a peening device being used on a flared aft portion and a part of a fore portion proximal to the flared aft portion of the shroud, shown by way of an enlarged section from detail B of FIG. 5, for plastically deforming the flared aft portion of the shroud towards a mounting rail of the sealing ring.

Now referring to FIG. 6, the method includes subjecting the flared aft portion 212 and a part 216 of the fore portion 208 proximal to the flared aft portion 212 of the first component i.e., the shroud 202 to peening until the flared aft portion 212 is plastically deformed from an initial position (refer to FIG. 6) to a desired final position (refer to FIG. 7) with respect to the second component i.e., the sealing ring 204.

Figure 7:
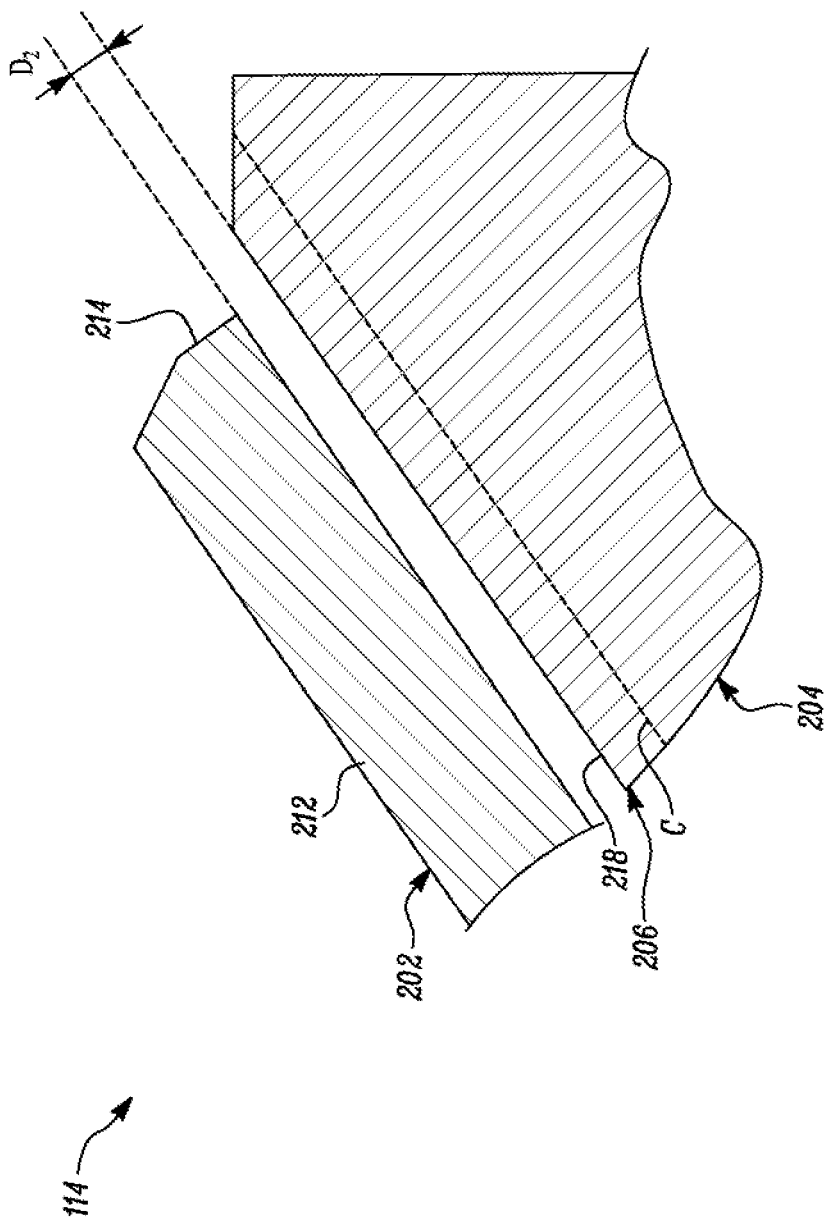
FIG. 7 is an enlarged side sectional view of the exemplary assembly showing the flared aft portion of the shroud at a desired final position with respect to the mounting rail of the sealing ring.

As shown in FIG. 6, the initial position of the flared aft portion 212 is characterized by the end 214 of the flared aft portion 212 being located at a first distance $D_1$ from an upper surface 218 of the mounting rail 206 of the sealing ring 204. Moreover, as shown, a peening device 602 is operatively used on the flared aft portion 212 and on the part 216 of the fore portion 208, proximal to the flared aft portion 212, such that the flared aft portion 212 is plastically deformed from its initial position, shown in FIG. 6, to a desired final position shown in FIG. 7. Referring to FIG. 7, the desired final position of the flared aft portion 212 is characterized by the end 214 of the flared aft portion 212 being located at a second distance $D_2$ from the upper surface 218 of the mounting rail 206 of the sealing ring 204. The distance $D_2$ obtained upon peening the flared aft portion 212 and the part 216 of the fore portion 208 proximal to the flared aft portion 212 and depicted in the view of FIG. 7 would be less than the distance $D_1$ shown in the view of FIG. 6.

In an embodiment herein, the flared aft portion 212 and the part 216 of the fore portion 208 proximal to the flared aft portion 212 of the shroud 202 could be subject to peening until the end 214 of the flared aft portion 212 is less than 0.01 inches away from the upper surface 218 of the mounting rail 206 of the sealing ring 204. In an example, upon peening the flared aft portion 212 and the part 216 of the fore portion 208 proximal to the flared aft portion 212, the end 214 of the flared aft portion 212 could be at a distance $D_2$ of 0.005 inches from the upper surface 218 of the mounting rail 206 of the sealing ring 204. In another example, upon peening the flared aft portion 212 and the part 216 of the fore portion 208 proximal to the flared aft portion 212, the end 214 of the flared aft portion 212 could be at a distance $D_2$ of 0.001 inches from the upper surface 218 of the mounting rail 206 of the sealing ring 204.

In an alternative embodiment, the flared aft portion 212 and the part 216 of the fore portion 208 proximal to the flared aft portion 212 could be subject to peening until the end 214 of the flared aft portion 212 abuts with the mounting rail 206 of the sealing ring 204. This embodiment, although applicable in cases where multiple mounting rails 206 are present on the sealing ring 204, could be implemented for use when the sealing ring 204 has a single continuous mounting rail extending therefrom.

Moreover, in embodiments herein, it will be appreciated that the peening process associated with the method of the present disclosure could be performed on the shroud 202 to plastically deform the flared aft portion 212 from its initial position (refer to FIG. 6) to the desired final position (refer to FIG. 7) by overcoming the stiffness of the flared aft portion 212 and the part 216 of the fore portion 208 proximal to the flared aft portion 212 even when the flared aft portion 212 and the part 216 of the fore portion 208 proximal to the flared aft portion 212 i.e., a length L of the shroud 202 measured between the weld 210 on the fore portion 208 and the end 214 of the flared aft portion 212 is less than an inch i.e., 2.54 centimeters. For example, as shown in FIG. 5, the length L of the flared aft portion 212 and the part 216 of the fore portion 208 proximal to the flared aft portion 212, measured between the weld 210 on the fore portion 208 and the end 214 of the flared aft portion 212, may be three-fourths of an inch i.e., 1.905 centimeters. In another example, this length L could be ½" i.e., 1.27 centimeters. In yet another example, this length L could be ¼" i.e., 6.3 millimeters.

In embodiments herein, the peening process used with respect to the method disclosed herein can include, but not be limited to, an ultrasonic peening process, a shot peening process, a water jet peening process, a flapper peening process, and a laser shock peening process.

Various embodiments disclosed herein are to be taken in the illustrative and explanatory sense and should in no way be construed as limiting of the present disclosure. All joinder references (e.g., attached, joined, associated, connected, welded and the like) are only used to aid the reader's understanding of the present disclosure, and may not create limitations, particularly as to the position, orientation, or use of the components and/or methods disclosed herein. Therefore, joinder references, if any, are to be construed broadly. Moreover, such joinder references do not necessarily infer that two elements are directly connected to each other. In addition, as used herein, "flared" can be defined, for purpose of illustration but not limitation, to mean an increase in the circumference of the first component 202 as one moves from a position adjacent to the fore portion 208 towards the mounting rails 206.

Additionally, all positional terms, such as, but not limited to, "fore", "aft", "first", "second" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

INDUSTRIAL APPLICABILITY

Embodiments of the present disclosure have applicability for use in refurbishing a machine assembly, or individual components thereof, particularly, without the need for disassembly of the individual components from one another.

Traditionally known overhauling techniques were cumbersome, time consuming, and less cost effective than the method disclosed herein in that the traditional overhauling techniques required, in some cases, for individual components to be disassembled prior to refurbishment being performed on one or more components, and in other cases, one or more components to be discarded and replaced. For example, with use of traditional overhauling techniques, the shroud would have been discarded and replaced with another shroud that complies with standards or specifications associated with the shroud. Such discarding and replacement of components is likely to entail increased costs, time, and effort in doing so.

However, with use of the method disclosed herein, individual components may be merely refurbished using the peening processes disclosed herein, while individual components may continue to remain in the assembled state with one another. This way, effort, time, and costs incurred with use of previously known overhauling techniques may be mitigated, and manufacturers of machine components may be allowed to reduce downtime of a machine due to service of machine assemblies therein.

In addition to plastically deforming parts or portions of components for repositioning such parts or portions of components into a desired position with respect to adjacent components, it is also hereby envisioned that with use of the peening process, the parts or portions subject to peening would be reinforced due to the peening process inherently imparting compressive residual stresses within the parts or portions of the component. For example, if the part 216 of the fore portion 208 of the shroud 202 herein is peened and the assembly 114 is installed for use in the machine 100, the part 216 of the fore portion 208 would now become more resistant to being displaced under the effect of loading. Such reinforcements through peening of the parts or portions of individual components of an assembly also helps to prolong a duration between service intervals, or stated differently, may help in reducing a frequency of subsequent service intervals that may be required on the assembly.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A method for refurbishing an assembly having a first component and a second component, the first component having a fore portion welded to the second component and a flared aft portion in proximity with the second component, the method comprising:
processing the assembly such that the flared aft portion and a part of the fore portion proximal to the flared aft portion of the first component are subject to peening until the flared aft portion is plastically deformed from an initial position, in which an end of the flared aft portion is located at a first distance from the second component to a desired final position, in which the end of the flared aft portion is located at a second distance from the second component, wherein the second distance is less than the first distance;

wherein the second component is a sealing ring for a gas turbine engine having a mounting rail located adjacent to a circumference of the sealing ring; and wherein the first component is a shroud having the flared aft portion, and wherein the end of the flared aft portion of the shroud is configured to co-operate with the mounting rail of the sealing ring.

2. The method of claim 1, wherein the peening includes at least one of: ultrasonic peening, shot peening, water jet peening, flapper peening, and laser shock peening.

3. The method of claim 1, wherein the flared aft portion and the part of the fore portion proximal to the flared aft portion of the shroud are subject to peening until the end of the flared aft portion is in abutment with the mounting rail of the sealing ring.

4. The method of claim 1, wherein the flared aft portion and the part of the fore portion proximal to the flared aft portion of the shroud are subject to peening until the end of the flared aft portion is less than 0.01 inches away from the mounting rail of the sealing ring.

5. The method of claim 1, wherein a length of the flared aft portion and the part of the fore portion proximal to the flared aft portion, measured between the weld on the fore portion and the end of the flared aft portion, is less than an inch.

6. A method for refurbishing a shroud having a fore portion welded to a sealing ring and a flared aft portion extending angularly from the fore portion such that an end of the flared aft portion is in proximity to a mounting rail of the sealing ring, the method comprising:

subjecting the flared aft portion and a part of the fore portion proximal to the flared aft portion of the shroud to peening until the flared aft portion is plastically deformed from an initial position of the end of the flared aft portion being located at a first distance from the mounting rail of the sealing ring to a desired final position of the end of the flared aft portion being located at a second distance from the mounting rail of the sealing ring, wherein the second distance is less than the first distance; and wherein the flared aft portion and the part of the fore portion proximal to the flared aft portion of the shroud are subject to peening until the end of the flared aft portion is in abutment with the mounting rail of the sealing ring.

7. The method of claim 6, wherein the peening includes at least one of: ultrasonic peening, shot peening, water jet peening, flapper peening, and laser shock peening.

8. The method of claim 6, wherein the mounting rail is located adjacent to a circumference of the sealing ring.

9. The method of claim 6, wherein the flared aft portion and the part of the fore portion proximal to the flared aft portion of the shroud is subject to peening until the end of the flared aft portion is less than 0.01 inches away from the mounting rail of the scaling ring.

10. The method of claim 6, wherein a length of the flared aft portion and the part of the fore portion proximal to the flared aft portion, measured between the weld on the fore portion and the end of the flared aft portion, is less than an inch.

\* \* \* \* \*